(12) United States Patent
Sorensen et al.

(10) Patent No.: US 7,976,367 B2
(45) Date of Patent: Jul. 12, 2011

(54) METHOD AND AN APPARATUS FOR EVISCERATION OF POULTRY

(75) Inventors: Bendt Sorensen, Allingabro (DK); Torben Andersen, Glesborg (DK)

(73) Assignee: Linco Food System A/S, Trige (DK)

( * ) Notice: Subject to any disclaimer, the term of this patent is extended or adjusted under 35 U.S.C. 154(b) by 8 days.

(21) Appl. No.: 12/446,684

(22) PCT Filed: Oct. 5, 2007

(86) PCT No.: PCT/DK2007/050141
§ 371 (c)(1),
(2), (4) Date: Apr. 22, 2009

(87) PCT Pub. No.: WO2009/043348
PCT Pub. Date: Apr. 9, 2009

(65) Prior Publication Data
US 2010/0062699 A1    Mar. 11, 2010

(51) Int. Cl.
*A22C 21/06* (2006.01)
(52) U.S. Cl. .......................... 452/118; 452/106
(58) Field of Classification Search .................. 452/106, 452/111, 117, 118
See application file for complete search history.

(56) References Cited

U.S. PATENT DOCUMENTS

| | | | | |
|---|---|---|---|---|
| 3,653,093 A | * | 4/1972 | Scheier | 452/118 |
| 3,886,635 A | | 6/1975 | Meyn | |
| 4,019,222 A | * | 4/1977 | Scheier et al. | 452/117 |
| 4,059,868 A | * | 11/1977 | Meyn | 452/120 |
| 4,516,290 A | * | 5/1985 | van Mil | 452/118 |
| 4,723,340 A | * | 2/1988 | Markert | 452/117 |
| 4,724,581 A | * | 2/1988 | van de Nieuwelaar | 452/118 |
| 5,707,280 A | * | 1/1998 | Tieleman et al. | 452/117 |
| 6,811,478 B2 | * | 11/2004 | van den Nieuwelaar et al. | 452/117 |
| 2008/0032615 A1 | * | 2/2008 | Tieleman et al. | 452/117 |

FOREIGN PATENT DOCUMENTS

| | | |
|---|---|---|
| DE | 37 09 869 A1 | 10/1988 |
| DE | 3709869 * | 10/1988 |
| EP | 0 094 724 A2 | 11/1983 |
| EP | 0178272 * | 4/1986 |
| WO | 98/44806 A1 | 10/1998 |

* cited by examiner

*Primary Examiner* — David J Parsley
(74) *Attorney, Agent, or Firm* — Sughrue Mion, PLLC (57) ABSTRACT

A method for eviscerating intestine packs of slaughtered poultry using evisceration devices. Each devise includes an evisceration spoon, which is inserted into the body of the poultry to a fully advanced position, in which the spoon surrounds the intestine pack on the breast side thereof. The evisceration spoon is subsequently retracted, thereby pulling the intestine pack out of the body. A guide is inserted together with the spoon and is moved across the esophagus during the forward movement within the body. While the crop is being pulled loose, the guide forms a bend on the esophagus, so that the esophagus extends from the bend to the crop in a direction more aligned with the retraction direction than the portion of the esophagus extending from the bend to the spoon.

15 Claims, 10 Drawing Sheets

METHOD AND AN APPARATUS FOR EVISCERATION OF POULTRY

The invention relates to a method for eviscerating intestine packs of slaughtered poultry by which decapitated poultry suspended in legs or joints are eviscerated in an evisceration apparatus comprising a number of evisceration devices each comprising an evisceration spoon, which is inserted into the body of the poultry in a movement forward and towards the breast bone, then moved forward along the breast bone and finally swung towards the back of the poultry to a fully advanced position, in which the spoon surrounds the intestine pack on the breast side thereof, and where the evisceration spoon is subsequently retracted, thereby pulling the intestine pack out of the body. The invention further relates to an apparatus for eviscerating intestine packs of slaughtered poultry.

As is well known to persons skilled in the art the esophagus of poultry does not run straight along the neck. Instead it starts centred at the beak and at the attachment to the crop it is located on the right-hand side of the spine, when seen from the breast side, the body hanging from the legs with the neck pointing downwards. The esophagus has thus twisted about the spine over approximately 90 degrees. From the crop it continues towards the proventriculus, which is located at the opposite side of the body, thus crossing the centre plane of the body defined by the spine and the sternum. When pulling back the intestines pack by means of the spoon, using for example the device known from U.S. Pat. No. 3,555,593, the esophagus is stretched to form a straight line between the crop and the proventriculus, the latter possibly being forced somewhat towards the centre of the body. As the esophagus is relatively inelastic and the crop is rather firmly attached to the neck, this pull may cause the esophagus to break at the point of attachment to the crop.

To overcome this problem clamping devices and grippers holding on to the esophagus in close vicinity to the crop have been used. An example of this is described in EP1011341. These methods has proven very efficient, but the grippers comprises small moveable parts and joints, which are difficult to keep clean and the clamping action may in some cases cause damage to the intestines or the esophagus. This may cause contamination of the finished product, either by transferring bacteria from one body to another or by spreading contents of the bowels or food remains left in the crop within the body cavity during the retraction.

Another example of a prior art evisceration method is known from EP 0 890 315. Here a smaller spoon is used, which does not encircle the intestines. Instead, it is kept flat against the gripper during insertion and is then raised by a pivoting movement prior to retraction. This device thus has an additional joint making it even more difficult to keep clean and functional than the one described above. Furthermore, this device has a rather uneven surface, which entails an increased risk of damages to the intestines, bone and meat during insertion.

In practice, the prior art methods described above are performed at great speeds, typically processing about 9000 broilers per hour. This entails a relatively violent insertion action, which from time-to-time causes broken ribs and other damages to the body, thus affecting the value of the finished product.

It is therefore the object of the invention to provide a method of eviscerating poultry and an apparatus therefore, where both the risk of contamination and the risk of damaging the intestines and/or parts of the body are minimised.

In a first aspect of the invention this is achieved with a method where a guide means of the evisceration device is inserted together with the spoon and is moved across the esophagus during the forward movement within the body, and where the guide means forms a bend on the esophagus, while the crop is being pulled loose, so that the esophagus extends from the bend to the crop in a direction more aligned with the direction of retraction than the portion of the esophagus extending from the bend to the spoon.

In a second aspect of the invention the object is achieved with an apparatus, where the evisceration device comprises a guide means having an end area located at the spoon edge, when the guide means is in a first position, which guide means is movable with respect to the evisceration spoon between the first position and a second position, in which the end area of the guide means is located at a distance from the evisceration spoon.

By forming a bend on the esophagus so that the part thereof, which is closest to the crop, is being brought into closer alignment with the direction of the retraction, the direction of the pull exerted on the esophagus is also changed to be closer aligned with the natural orientation of the part of the esophagus located in the neck. With the prior art methods and devices the pull has always been applied at the centre of the body, meaning that the pull has been skew in relation to the natural course of the esophagus. With the alignment now achieved, the risk of the esophagus breaking is minimised and the crop can be pulled loose using a smaller force, than what has hitherto been required. In this way the evisceration can be performed without the use of a gripper, the pull on the esophagus resulting only from the retraction of the spoon.

In this, the pull and bend is described as being related to the esophagus only. It is, however, to be understood that in some embodiment the guide means may also engage the trachea, which will also come under tension, when the intestines pack is being extracted by the spoon, and which runs substantially parallel to the esophagus.

The indication, that the end area of the guide means is "located at the spoon edge" when in the first position is not to be understood as meaning, that there should be an exact alignment. On the contrary, the end of the guide means may project over the spoon edge to thereby ensure that the esophagus cannot slip past the guide means under the influence of the pull of the spoon. The shape and dimensions of the projection should, however, be such that it does not cause damage during the insertion or prevent the spoon from coming sufficiently close to the back of the body.

The guide means may in principle be of any configuration suitable for keeping the esophagus from moving towards the centre of the body, but in a preferred embodiment the end area of the guide member is hook-shaped with the tip projecting in the direction of retraction. The hook keeps the esophagus in place so that it does not slide sideways off the guide means under the influence of the pull. It, however, does not retain the esophagus in the direction of the pull exercised by the evisceration spoon.

The hook-shape may be such that a loop is formed between the guide means and the spoon when in the first position. The loop should be of a relatively limited size so that the crop and/or intestines pack cannot pass trough it, meaning that the intestines pack may thus hang from the end area of the guide means when no longer confined in the space between the spoon and the back of the body.

Depending on the design of the guide means, it may, when in the first position, form a projecting edge or tooth, which helps keeping the intestines pack within the spoon until it can be passed on to a shackle or bowl on a separate conveyor. As a clamping of the esophagus between the guide means and the spoon may cause it to break, it is preferred that when the guide means is in its first position a free space of approximately 2-6 mm is present between its end area and the spoon. This free space may for example constitute a loop as described above.

Irrespective of other considerations to be taken, the guide means, and particularly its end area, should be designed with as few corners, joints etc. as possible to thereby reduce the risk of it causing damages during insertion and retraction, reduce the amount of material that can stick to it and allow easy cleaning. In a preferred embodiment the part of the guide means that is actually in contact with the poultry consist of one uninterrupted unit, such as a rod of stainless steel, which may be bend for the formation of a hook-shape and possibly also pointed.

In some rare cases the anatomy of a slaughter animal may be mirror-inverted so that the crop is located at the left-hand side and the proventriculus at the right-hand side. It is therefore preferred to use a guide means that is symmetrical in relation to the centre plane of the body, thereby minimising the number of bodies that are not eviscerated properly.

When inserting the evisceration device in the body, the guide means is preferably kept in a first position, where it is hidden in the spoon, such as in an arched recess in a closed back of the spoon, whereby the outer surface of the evisceration device is kept substantially even. This minimizes the risk of the guide means causing damage during the insertion. As the guide means follows the same path as the spoon on the insertion, it is effectively swung in underneath the esophagus during the forwards and inwards movement, which brings the spoon into contact with the back.

Once inserted, the guide means can be brought into a second position, preferably by keeping it substantially stationary, while retracting the spoon. In a preferred embodiment the guide means is kept in the advanced position until the esophagus have been stretched out by the retraction of the spoon and is then retracted, ultimately bringing it back into the first position. The retraction of the spoon and the guide means need not be performed as separate steps nor with the same speed. On the contrary it may be advantageous that the retraction of the two are performed concurrently. In that way, the processing speed may be optimized and guide means may be back in its first position at the time when the spoon exits the body, without the spoon having to wait for the guide means.

Above a preferred embodiment of the operation of the evisceration device has been described, but other modes of operation may also be employed. For example the guide means may be moved together with the spoon until reaching the position of the bend on the esophagus, whereupon the spoon is retracted by itself for applying the necessary pull on the esophagus. Once the crop and the neck part of the esophagus has been pulled loose, the guide means is then brought back into the first position where, depending on its design, it can help retain the eviscerated intestines pack.

The path followed during the insertion may in principle be the same as with the methods known from the prior art. With these it has, however, been commonly accepted that occasional damages to the intestines pack as well as to meat and bone of the finished product were an unavoidable consequence of the high processing speeds.

In the meantime, it has now been discovered that, according to the invention, the number of damages can be considerably reduced by connecting the members controlling the spoon with a slack. In this way the evisceration device may yield when coming into contact with the body thereby minimising the risk of breaking the ribs etc. This is a particular advantage if the bodies being processed are of varying size, i.e. different age, race or the like. For use in a typical slaughter line for the processing of broilers the yield should be at least 30 mm measured at the tip of the spoon and preferably approximately 55 mm. If processing other birds these dimensions should of course be adapted appropriately.

In this, the terms "upwards" and "downwards", "uppermost" and "lowermost" etc. are used referring to the orientation of the poultry when hung from the legs, neck down. It is, however, to be understood that if positioning the poultry in a different manner these directions should be altered accordingly. Similarly it is to be understood that the use of terms such as "upwards" and "downwards" are not to be considered as meaning that the direction should be exactly vertical, but only serves as a general indication of direction.

In the following the invention will be illustrated by examples and by reference to the accompanying drawing in which.

Figure 1:
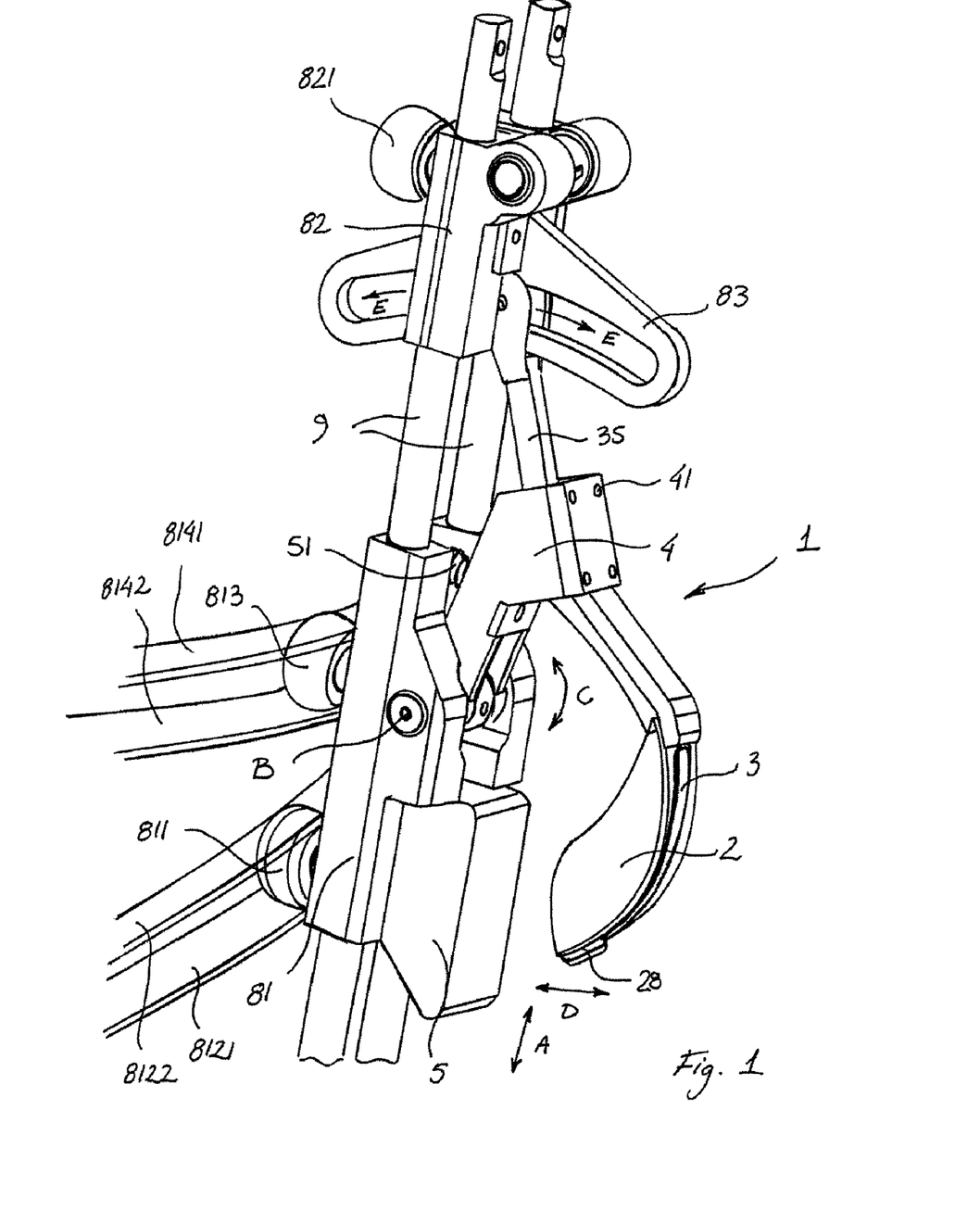
FIG. 1 is a perspective view of an evisceration device according to the invention when in its first position.
Figure 2:
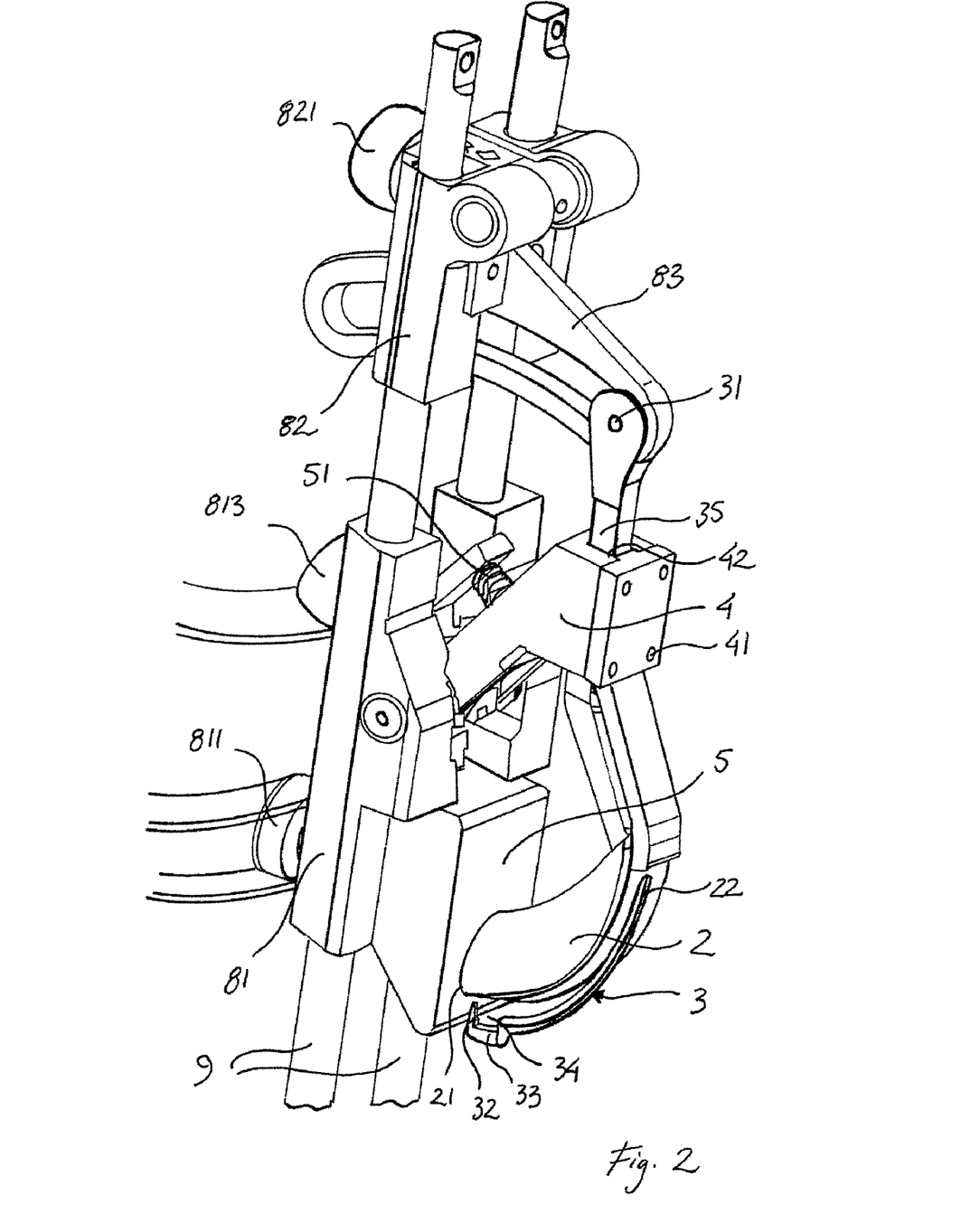
FIG. 2 is a perspective view of the evisceration device when in its second position.

An embodiment of an evisceration device 1 according to the invention is shown in FIGS. 1 and 2. The device comprises a spoon 2 and guide means 3 mounted on a common arm 4, which is in turn connected to an evisceration apparatus (not shown) comprising several such evisceration devices.

Both the spoon 2 and the guide means 3 may be displaced as illustrated with the arrow A and swung about the horizontal axis B as illustrated by the arrow C. The evisceration device is kept up against the abutment 5 by means of a coil spring 51, but is connected to the apparatus with a slack allowing it to move as illustrated by the arrow D.

In this embodiment the displacement A is achieved by the shoes 81 and 82 sliding on the bars 9, the spoon 2 being fixed to the lower gliding block 81 and the guide means 3 being controlled by the upper gliding block 82. The guide means is attached to the gliding block 82 via the track 83, the guide means being able to rotate about the joint 31, which may travel back and forth following the curvature of the track as illustrated by the arrows E.

Thanks to the mounting on separate gliding blocks 81,82, the spoon 2 and the guide means 3 are mutually displaceable so that they may be moved between a first position illustrated in FIG. 1 and a second position illustrated in FIG. 2. In the preferred embodiment the movement of the gliding blocks is achieved by the wheels 811 and 821 running in guideways on the apparatus as exemplified by the guideway 812. The spoon is fixed to the arm 4, here by means of screws 41, and the guide means may slide in the passage 42, so that it comes to project from the spoon, when the gliding blocks 81, 82 are brought closer together, thus bringing it from the first to the second position.

In the present embodiment the spoon 2 has a recess 22 in its outer side, which accommodates the guide means 3 completely when in the first position, so that the outer surface of the evisceration device appears smooth. To achieve this, the guide means are curved corresponding to the curvature of the spoon. A similar effect could for instance be achieved by the guide means being located on the interior side of the spoon when in the first position, but the interior of the device should also be kept as smooth as possible to minimise the risk of damages to the intestines.

At the tip edge of the spoon 2 where the recess ends there is an indentation 28 having substantially the same cross section as the recess 22. In the first position this indentation is substantially closed off by the end of the guide means 3 and in the second position it forms an opening through which the esophagus may project as will be explained below.

As may best be seen in FIG. 2 the guide means 3 of this embodiment has a hook-shape, where the shape of the hook is designed so that it may catch the esophagus and keep it from sliding off the guide means.

In the embodiment shown, the tip 32 of the hook is pointing upwards and the outermost straight part 33 of the guide means is offset in relation to the main part of the guide means so that a loop 34 of 2-6 mm is formed between the guide means and the spoon when in the first position. This loop may be used for suspending the intestines pack (not shown), the crop 13 being located on one side of the guide means and the proventriculus 16 and the rest of the intestines pack on the other, both being to large to pass trough the loop. As, in the present embodiment, there is no separate means for retaining the intestines pack in the spoon it will fall out once the evisceration device leaves the body and thus hang from the loop, where it may pass the veterinary inspection, if veterinary inspection is applied.

The guide means 3 may, however, also be just a curved rod with no hook-effect at all or have an L-shape, the foot of the L pointing upwards. These embodiments will be even easier to keep clean and provide an even smoother design, which can be inserted with even less damage to the body.

Regardless of the design, the entire guide means 3 is preferably formed from a single bar of stainless steel, so that no joints are inserted into the cavity of the body, and all surfaces should be rounded, so that they will not cut or pierce the meat, intestines, esophagus or any other part of the body. When using a hook shaped guide means the outermost tip of the hook should also be flat or rounded.

A preferred embodiment of the operation of the evisceration device is illustrated in FIGS. 3*a*-3*i*. Below it will be described as used for evisceration of broilers, but it is to be understood that it may equally be used with other types of poultry, possibly with slight variations in the proportions of different parts of the evisceration device.

A broiler 10, which has been plucked and opened, is hanging by the legs in a shackle 6, which is mounted on the evisceration apparatus. Typically, such an apparatus, which is well known per se, comprises a series of shackles, which are being moved by an overhead conveyor (not shown) and a turning wheel (not shown) with a number of evisceration devices 1. The overall construction of the apparatus, however, has no bearing on the functioning of the evisceration device, which may therefore also be used in an apparatus having for example a linear course.

Figure 3A:
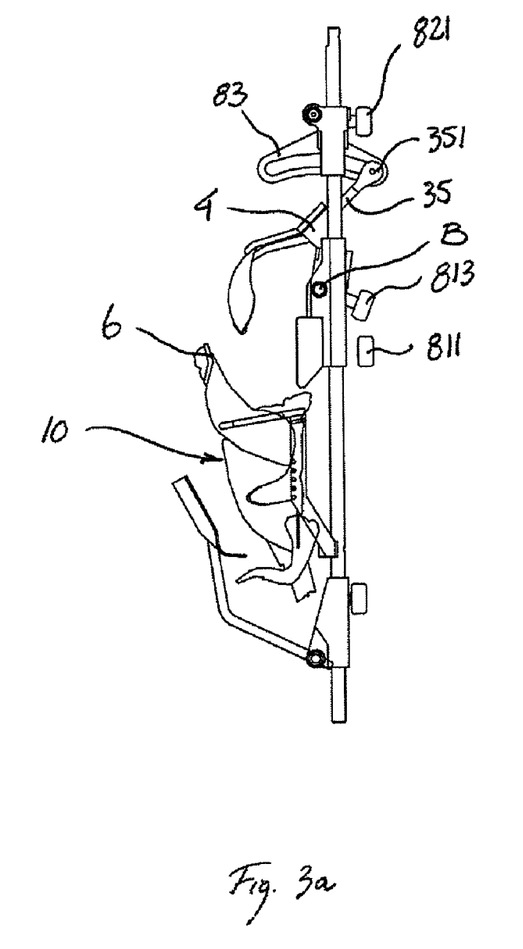
FIGS. 3*a*-3*i* shows schematic cross-sectional views of the introduction and retraction of the evisceration device according to the invention.
Figure 3B:
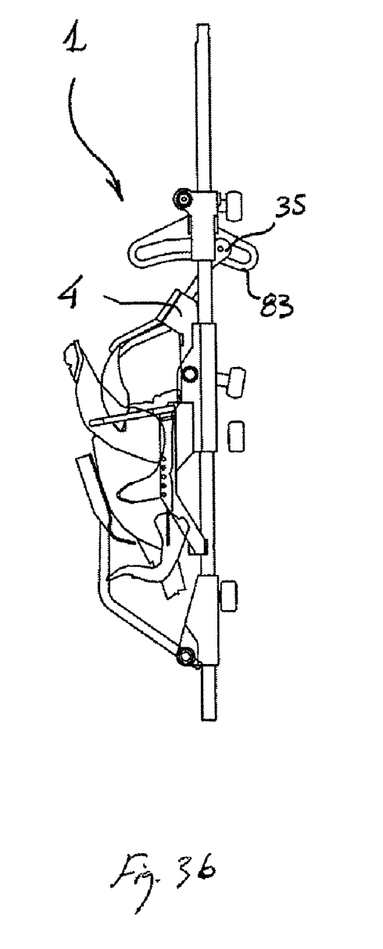
Figure 3C:
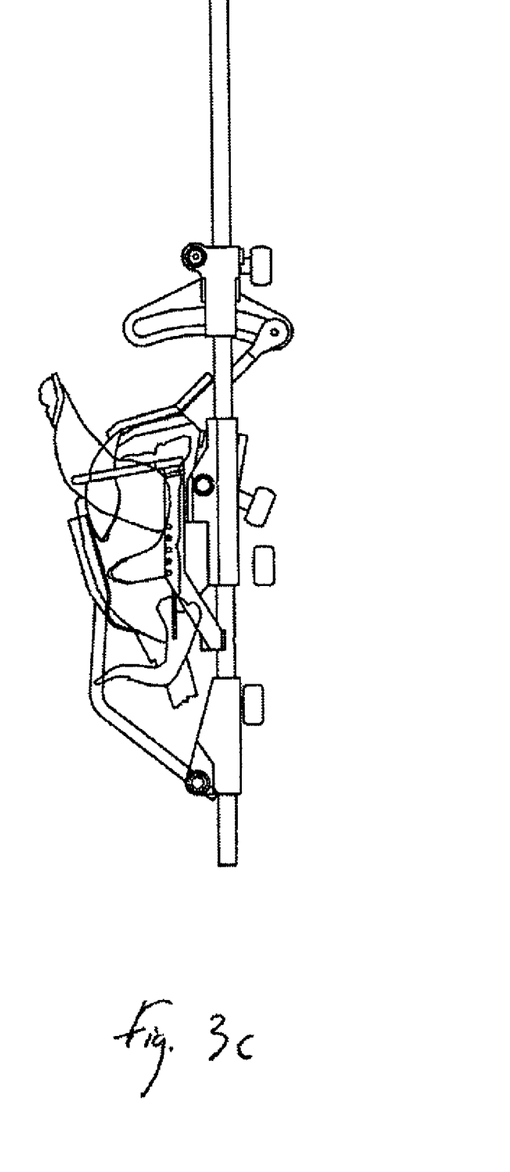
Figure 4:
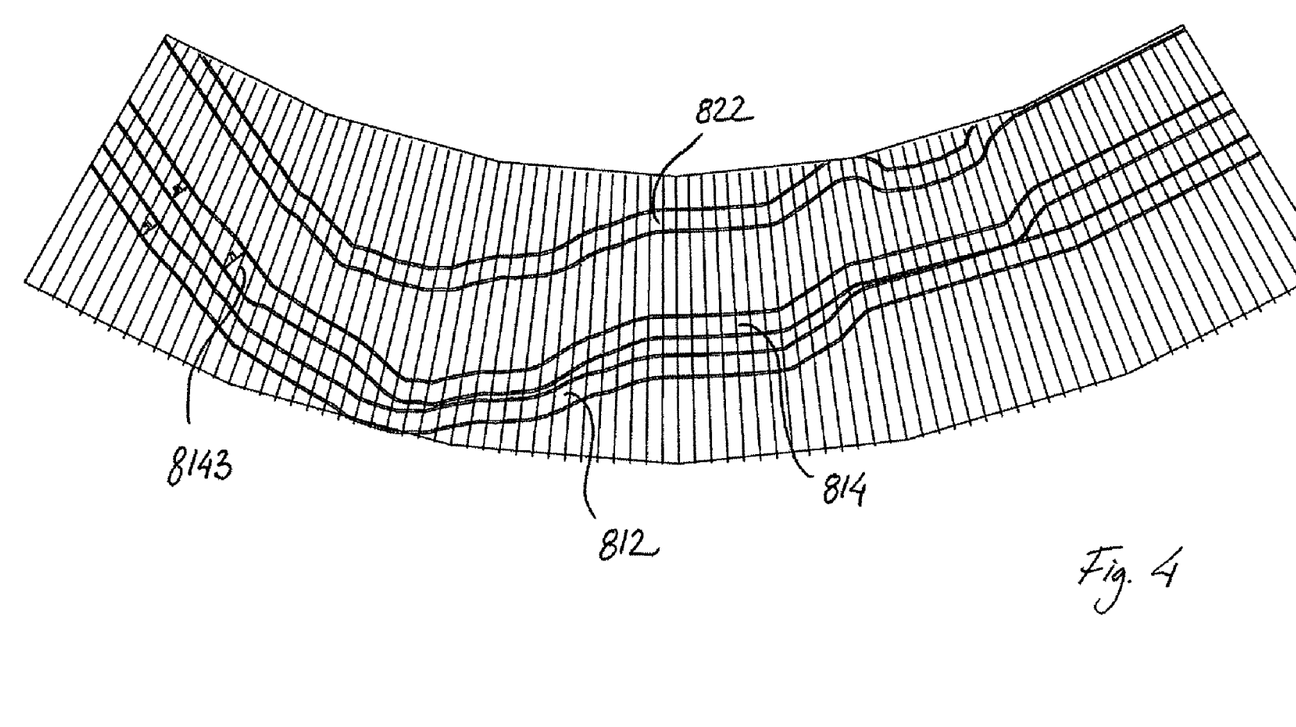
FIG. 4 is a graphical representation of the path followed by the different parts of the evisceration apparatus during the evisceration cycle.
Figure 5:
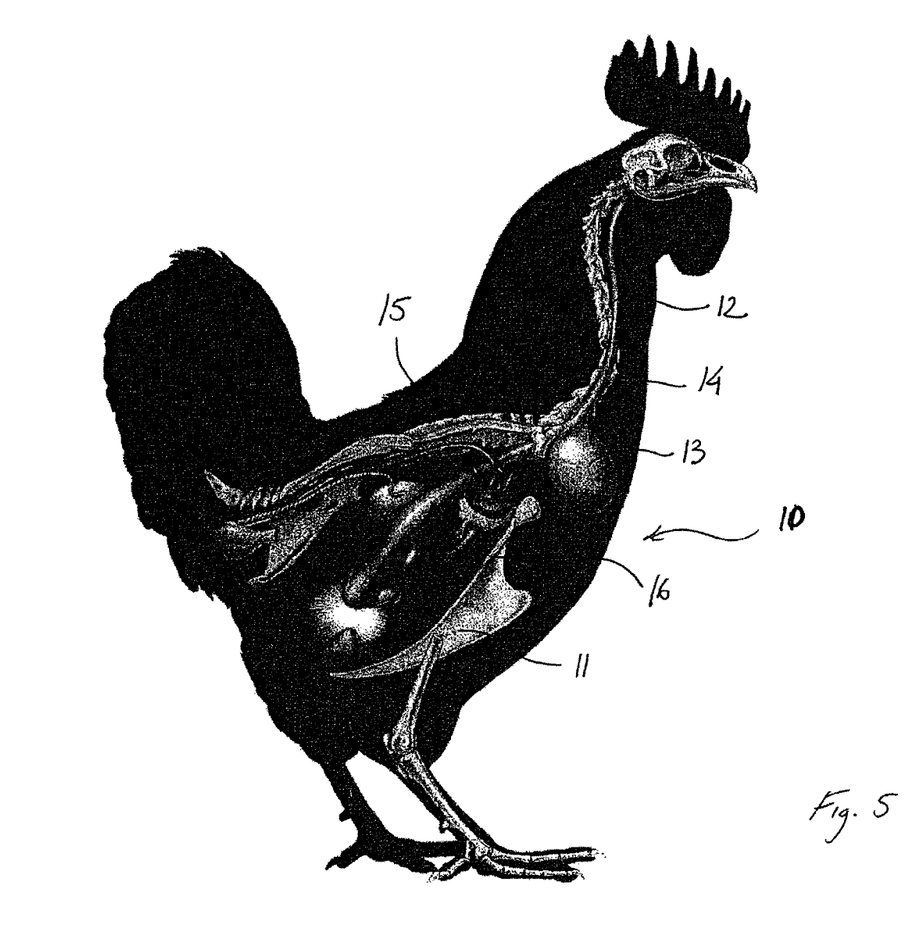
FIG. 5 is an anatomic sketch of a broiler.

The evisceration device, which is kept in its first position, enters the body of the broiler 10 from above as shown in FIG. 3*a*-*b* and follows a curved path, where it moved downwards and outwards as shown in FIG. 3*b*-*c* towards the tip of the sternum 11 (see FIG. 5). During the insertion, the spoon is swung about a horizontal axis B to allow it to follow shape of the body cavity as closely as possibly. The actual swinging of the spoon is achieved by the arm 4 being forced away from or towards the bars 9 by the wheel 813 following the guideway 814 as depicted in FIG. 4. The path followed by the spoon is further controlled by the track 83, in that the guide means is only moveable in relation to the spoon along the length axis of its shaft 35 and that the shaft end 351 is forced to follow the track 83. The movement of the shaft end in relation to the track and of the shaft in relation to the arm may be seen by comparing FIGS. 3*a*-*i*.

As explained above, the movement of the different parts of the evisceration devices is controlled by a series of wheels 811, 813, 821, which run in guideways 812, 814, 822 on the stationary part of the apparatus. In the embodiments shown the guideways are formed by pairs of projecting flanges 8121, 8122, 8141, 8142, but may also be grooves in a surface of the apparatus. The course of the three guideways in relation to each other is illustrated in FIG. 4, where the uppermost guideway 822 is followed by the uppermost wheel 821, the middle guideway 814 is followed by the middle wheel 813 and the lowermost guideway 812 by the lowermost wheel 811.

The flanges or side walls of each guideway need not be perpendicular to the surface of the apparatus. If an element of the apparatus is to be swung an angling of the flange or wall may contributed to a tilting of the wheel.

FIG. 4 corresponds to an embodiment of the apparatus, where the evisceration devices follows a cylindrical path. The guideways as depicted in FIG. 4 and thus the actual evisceration then runs over 180 degrees, whereas the remaining 180 degrees is used for bringing the evisceration devices back into its starting position for receiving a new body.

When the evisceration device passes the liver, which is one of the most fragile parts of the intestines pack, its path is substantially vertical and parallel with the sternum 11, see FIG. 3*c*, the guide means still been kept within the spoon. During this part of the movement the spoon edge 21 and thus the outermost end of the guide means 3 passes the esophagus 12, which is located further to the right in FIG. 3*c*.

Figure 3D:
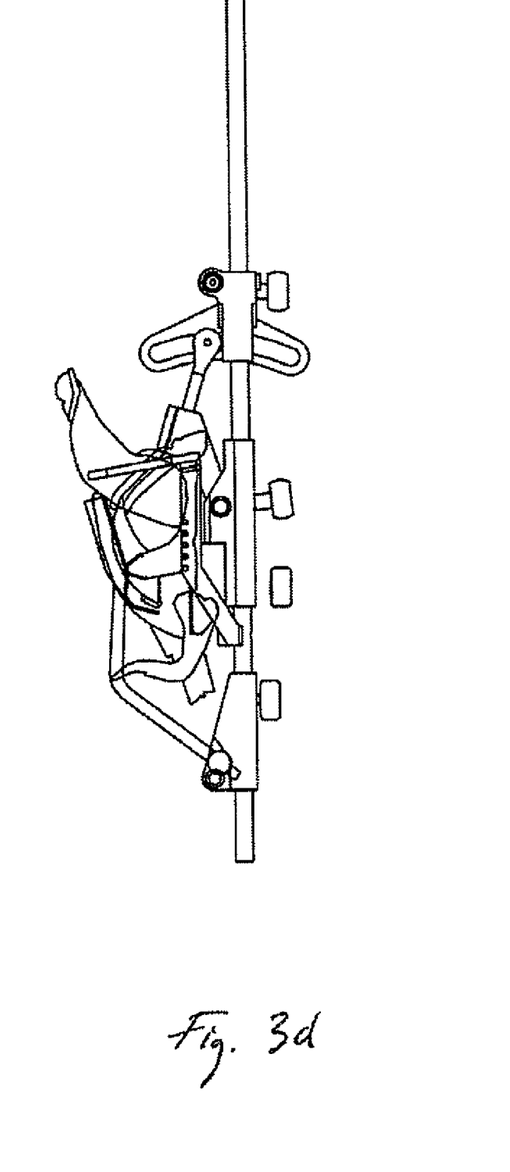
Figure 3E:
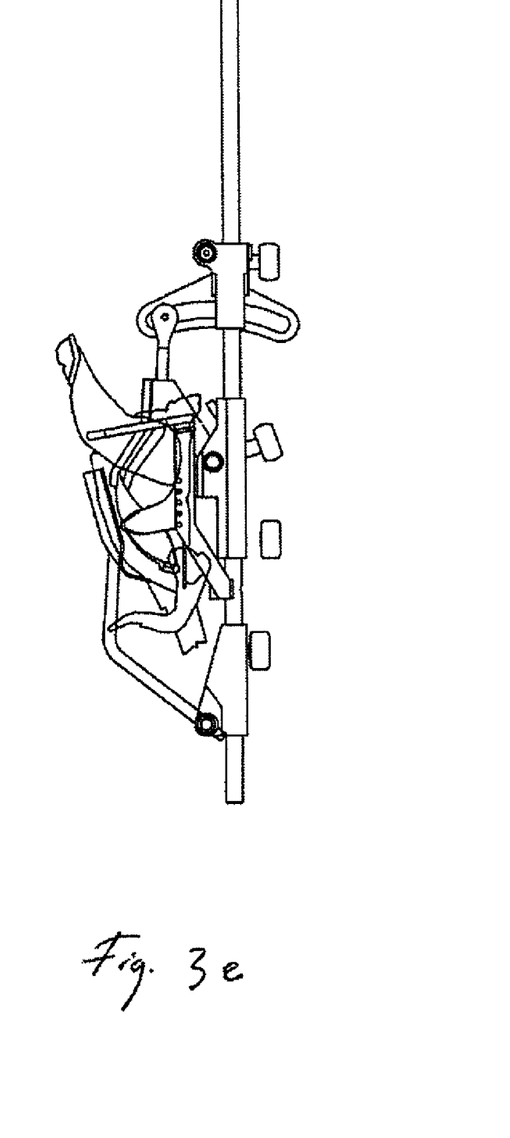

When approaching the neck area 14 of the body, the spoon is moved inwards towards the back 15 as displayed in FIG. 3*d*-*e*. During this part of the movement the guide means is brought in underneath the esophagus 12. The spoon now encircles the intestines pack with the lower edge 21 of the spoon located just above the crop 13 as displayed in FIG. 6.

Figure 3F:
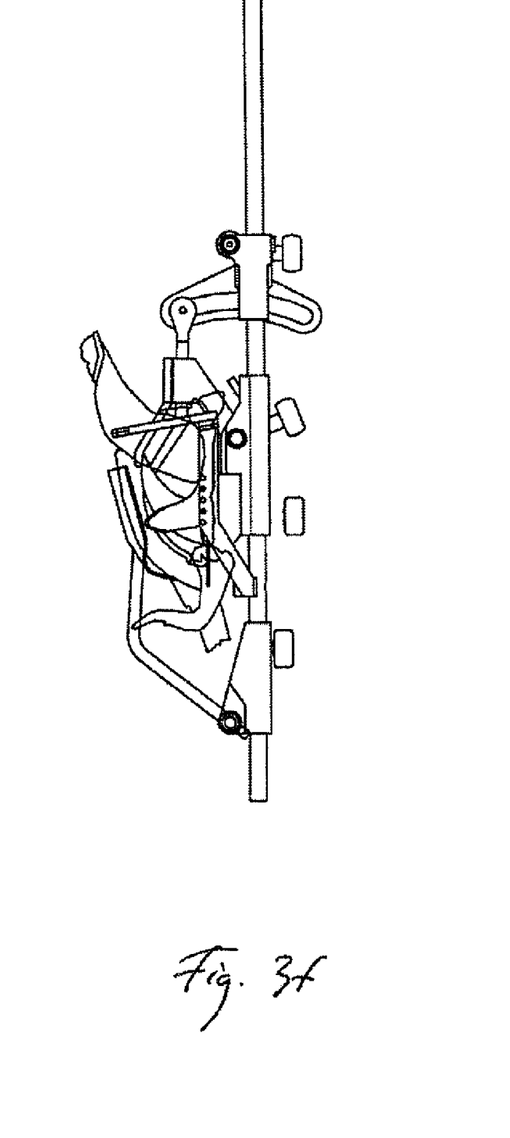
Figure 3G:
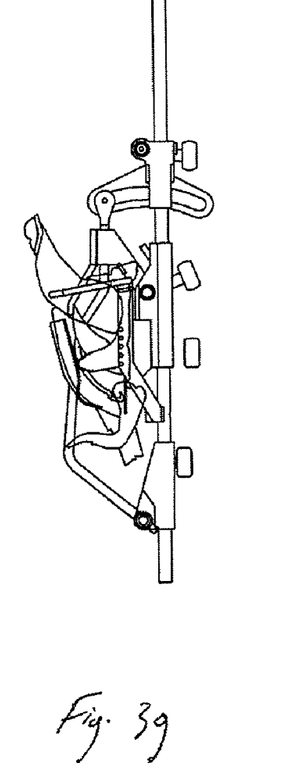
Figure 3H:
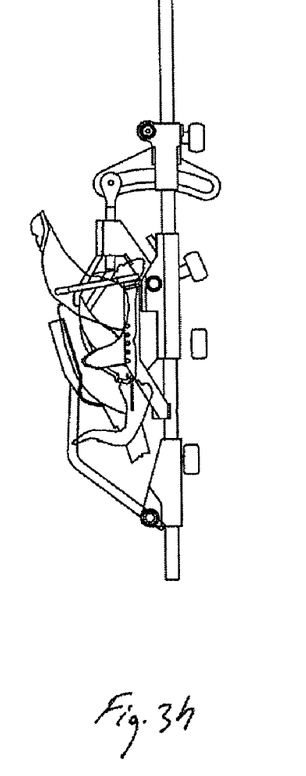
Figure 3I:
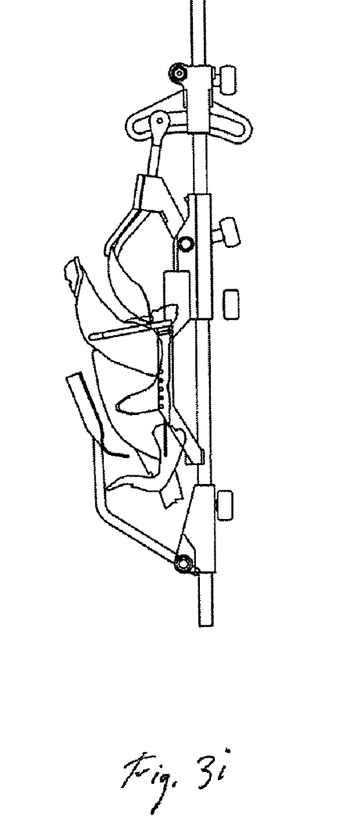
Figure 6:
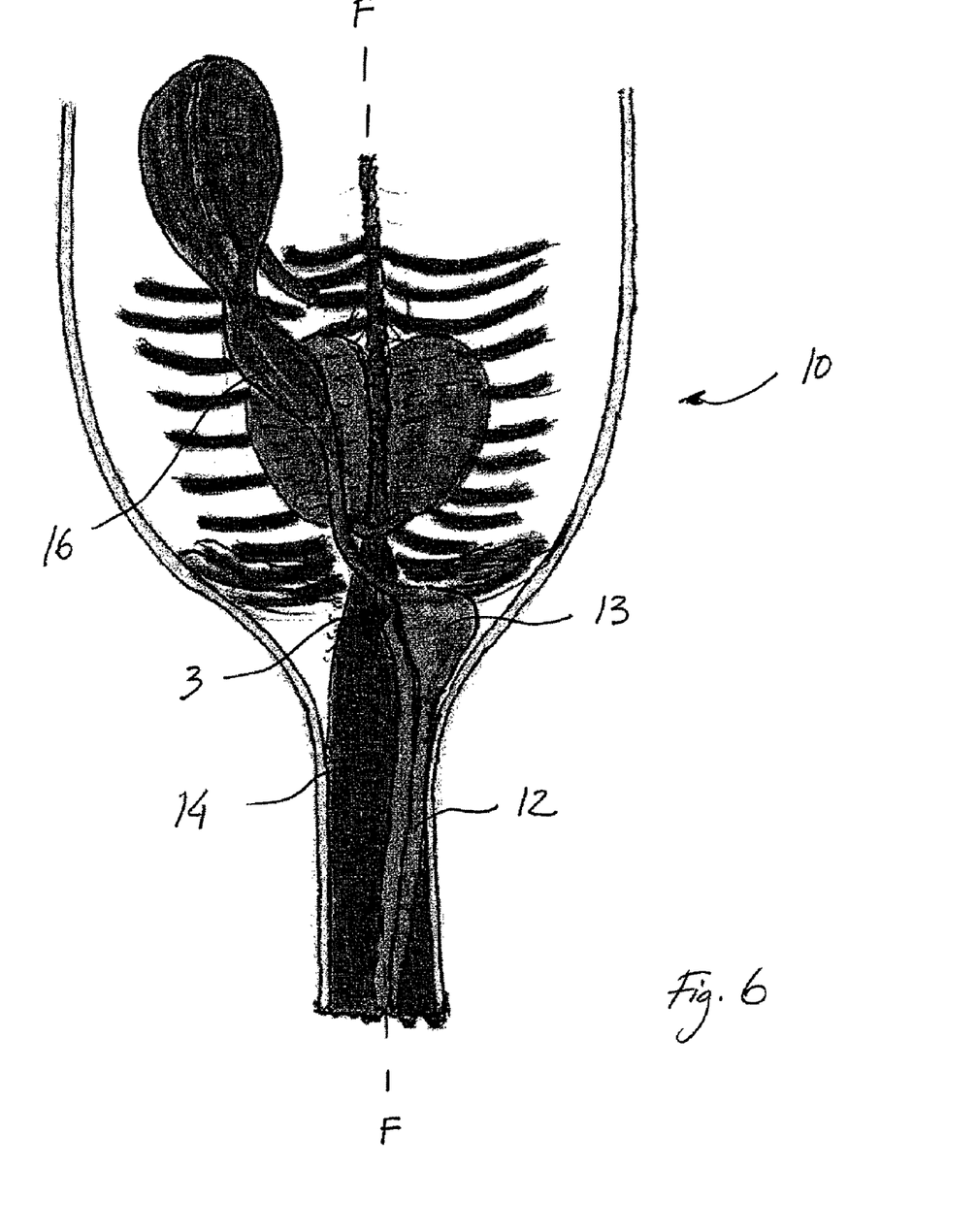
FIG. 6 is a cross sectional sketch of the location of the guide means in relation to body and some of the organs when in the fully advanced position.
Figure 7A:
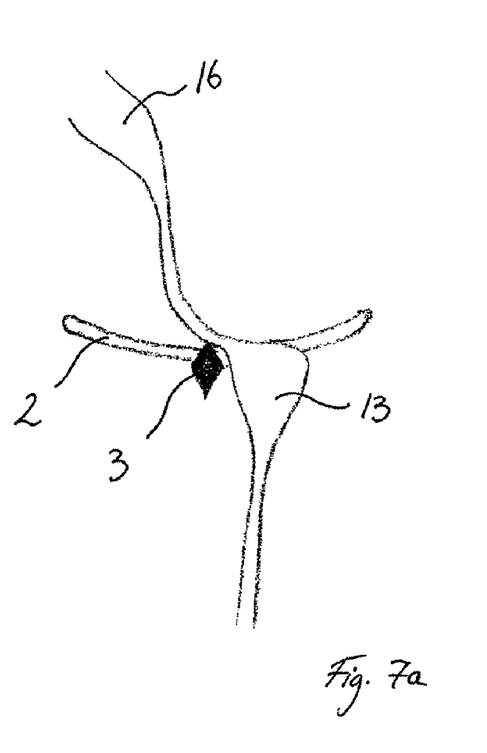
FIGS. 7*a*-*c* is a series of sketches of the path of the esophagus at different stages of the evisceration.
Figure 7B:
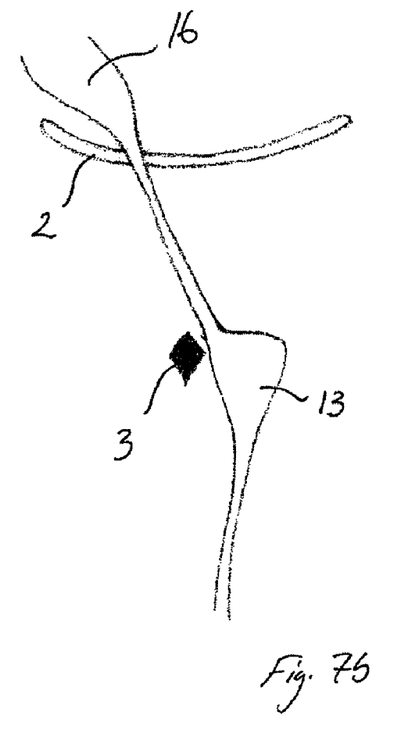

In the embodiment of operation the spoon 2 now starts to move up, whereas the guide means 3 stays in the position shown in FIGS. 3*f* and 6, thus bringing the evisceration device from its first to its second position. During the retraction the spoon is pressing up against the back of the body so that the intestines pack (illustrated by the proventriculus 16 in FIG. 7) is kept within the spoon. The pull on the intestines pack means that the esophagus 12 connecting it to the crop 13 is stretched out, bringing it from the initial position shown in FIGS. 6 and 7*a* to the position in FIG. 7*b*, thus forming a straight line, which crosses the centre plane F of the body. The pull may cause the esophagus to slide towards the centre of the spoon and slip into the indentation 28, but due to the narrow space within the body and the spoon pressing the intestines pack up against the back, this will rarely be the case.

Figure 7C:
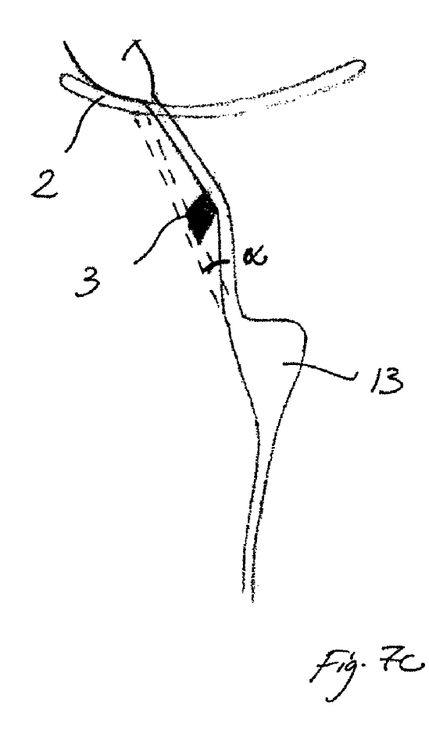

The guide means is now moved upwards, thus coming into contact with the esophagus and forming a bend thereon as illustrated in FIG. 7*c*. The formation of the bend increases the tension on the esophagus, as it now has to cover a grater distance, and the direction of the part of the esophagus closest to the crop 13 is changed as depicted by the angle $\alpha$ in FIG. 7*c*, the broken line corresponding to the position of the esophagus in FIG. 7*b*. The esophagus thus becomes less skewed in relation to the natural orientation of the part thereof located in the neck 14. This change of orientation reduces the risk of the esophagus breaking at the attachment to the crop and eases the loosening of the crop.

Alternatively the guide means may 3 be moved upwards together with the spoon 2 until reaching the position of the bend (FIG. 7c) and the spoon may then continue upwards for the purpose of applying the pull. Similarly the guide means may be moved upwards in several steps thus gradually changing the direction and increasing the pull on the esophagus and crop. Other possible modes of operation, where the spoon and guide means are moved differently in relation to each other may be envisaged by the skilled person.

Irrespective of which pattern of movement is chosen, the guide means should be back in the first position at the time, when the evisceration device exits the body cavity, to thereby allow it to contribute to carrying the intestines pack when the hold provided by the back of the body is no longer present.

Care should of course be taken, that the guide means do not crush or otherwise damage any part of the intestines pack. In the preferred embodiment this is ensured by the major part of the guide means being located on the exterior side of the spoon.

The guide means should preferably be designed in such a manner that the outermost end, which is in contact with the esophagus, inclines slightly backwards to thereby prevent the esophagus from sliding off when affected by the pull. This may be achieved with a hook-shape as the one shown in FIGS. 1 and 2, but an appropriate curvature or the provision of a bend giving the guide means an L-shape may also serve the purpose. The guide means also contributes to breaking some of the membranes connecting the esophagus to the neck.

The path followed by the spoon during its insertion and retraction is tailored to follow the interior shape of the body cavity as closely as possible to thereby minimise the risk of crushing any part of the intestines and of breaking ribs or other bones. These efforts are, however, impeded by the natural variations in the size and shape of each individual broiler.

According to the invention each evisceration device is therefore mounted on the apparatus with a slack allowing it to yield if meeting too much resistance, which will for example be the case if the spoon is pressed against the back with a force that might cause the ribs to break. For an apparatus designed for processing broilers a slack of 50 mm as measured at the tip of the spoon will be appropriate. If in stead processing smaller or larger birds such as doves or turkeys the slack should of course be adapted in size, a slack of approximately 80 mm being envisaged for the processing of turkeys.

The yield, which is illustrated by the arrow D in FIG. 1, may be achieved in numerous ways as will be apparent to the person skilled in the art. In the embodiment shown it is done by means of the spring 51 in combination with an expansion 8143 of the guideway 814 followed by the wheel 812 as may be seen in FIG. 4. In the present embodiment the expansion constitutes approximately 40% of the width of the non-expanded guideway, corresponding to a yield of 30 mm at the tip of the spoon. When combined with a spring contributing a yield of 23 mm a total yield of 53 mm, which have been shown to be particularly advantageous, is achieved.

In the embodiment shown in FIG. 4 there is only one local expansion 8143 of the guideway 814, but it is of course also possible to have several expanded sections or to use a guideway, which is oversized other its entire length.

The breaking of ribs is a particular problem whereas the area of the sternum is less fragile and it is therefore preferred that the slack is only present during the retraction of the evisceration device.

The embodiments shown and described in the above is to serve as explanatory examples only and it is to be understood that the different features thereof may be combined freely and that no feature should be seen as essential unless stated in the claims. Similarly the person skilled in the art will be able to conceive alternative embodiments of different features without thereby departing from the scope of the claims.

The invention claimed is:

1. A method for eviscerating poultry having an intestine pack and a body having a centre plane and comprising a back, a breast with a breast bone, an esophagus oriented at an angle to the centre plane, a crop, legs and joints, by which method decapitated poultry suspended in the legs or joints are eviscerated in an evisceration apparatus comprising a number of evisceration devices each comprising an evisceration spoon and a guide means, wherein the evisceration spoon is inserted into the body of the poultry in a movement forward and towards the breast bone, then moved forward along the breast bone and finally swung towards the back of the poultry to a fully advanced position, in which the evisceration spoon surrounds the intestine pack on a side facing the breast, and wherein the evisceration spoon is subsequently retracted, thereby pulling the intestine pack out of the body, wherein the guide means is inserted together with the evisceration spoon and is moved across the esophagus during the forward movement within the body, and wherein the guide means forms a bend on the esophagus, thereby changing the angle between the centre plane of the body and the parts of the esophagus on either side of the bend, while the crop is being pulled loose, so that the esophagus extends from the bend to the crop in a direction more aligned with a direction followed by the evisceration spoon during retraction thereof than a portion of the esophagus extending from the bend to the evisceration spoon.

2. The method according to claim 1, wherein, during the insertion, the guide means is kept in a first position at the evisceration spoon.

3. The method according to claim 2, wherein, when in the first position, the guide means is kept in an arched recess in a closed back of the evisceration spoon.

4. The method according to claim 2, wherein the retraction of the evisceration device is performed in two steps, during the first of which, the evisceration spoon is retracted while the guide means is kept substantially stationary in relation to the body, and, during the second of which, the guide means is retracted in relation to the body.

5. The method according to claim 4, wherein in the second step both the guide means and the evisceration spoon are retracted from the body.

6. The method according to claim 4, wherein the guide means has resumed its first position, when the evisceration spoon exits the body.

7. The method according to claim 1, wherein at least during a part of the retraction of the evisceration spoon a slack in members controlling the evisceration spoon allows the evisceration spoon to yield in relation to the body.

8. The method according to claim 1, wherein the evisceration spoon has a tip, which is leading during the forward movement of the evisceration spoon, and wherein the evisceration spoon can yield at least 30 mm at the tip in relation to the body.

9. A method for eviscerating poultry having an intestine pack and a body that comprises a back, a breast with a breast bone, an esophagus, a crop, legs and joints, by which method poultry are eviscerated in an evisceration apparatus comprising a number of evisceration devices each comprising an evisceration spoon and a guide means movable in relation to the spoon, wherein the evisceration spoon is inserted into the body of the poultry in a movement forward and towards the breast bone, then moved forward along the breast bone and finally swung towards the back of the poultry to a fully advanced position, in which the evisceration spoon surrounds the intestine pack on a side facing the breast, and wherein the evisceration spoon is subsequently retracted, thereby pulling the intestine pack out of the body, wherein the guide means is inserted together with the evisceration spoon and is moved across the esophagus during the forward movement within the body, and wherein the guide means forms a bend on the esophagus, while the crop is being pulled loose, thereby changing the angle between the centre plane of the body and the parts of the esophagus on either side of the bend, so that the esophagus extends from the bend to the crop in a direction more aligned with a direction followed by the evisceration spoon during retraction thereof than a portion of the esophagus extending from the bend to the evisceration spoon.

10. The method according to claim 9, wherein, during the insertion, the guide means is kept in a first position at the evisceration spoon.

11. The method according to claim 10, wherein, when in the first position, the guide means is kept in an arched recess in a closed back of the evisceration spoon.

12. The method according to claim 10, wherein the retraction of the evisceration device is performed in two steps, during the first of which, the evisceration spoon is retracted while the guide means is kept substantially stationary in relation to the body, and, during the second of which, the guide means is retracted in relation to the body.

13. The method according to claim 12, wherein in the second step both the guide means and the evisceration spoon are retracted from the body.

14. The method according to claim 12, wherein the guide means has resumed its first position, when the evisceration spoon exits the body.

15. The method according to claim 9, wherein at least during a part of the retraction of the evisceration spoon the evisceration spoon is allowed to yield in relation to the body.

* * * * *